Oct. 2, 1962
C. L. ALDRIDGE ETAL
3,056,771
POLYMERIZATION PROCESS
Filed Aug. 1, 1955
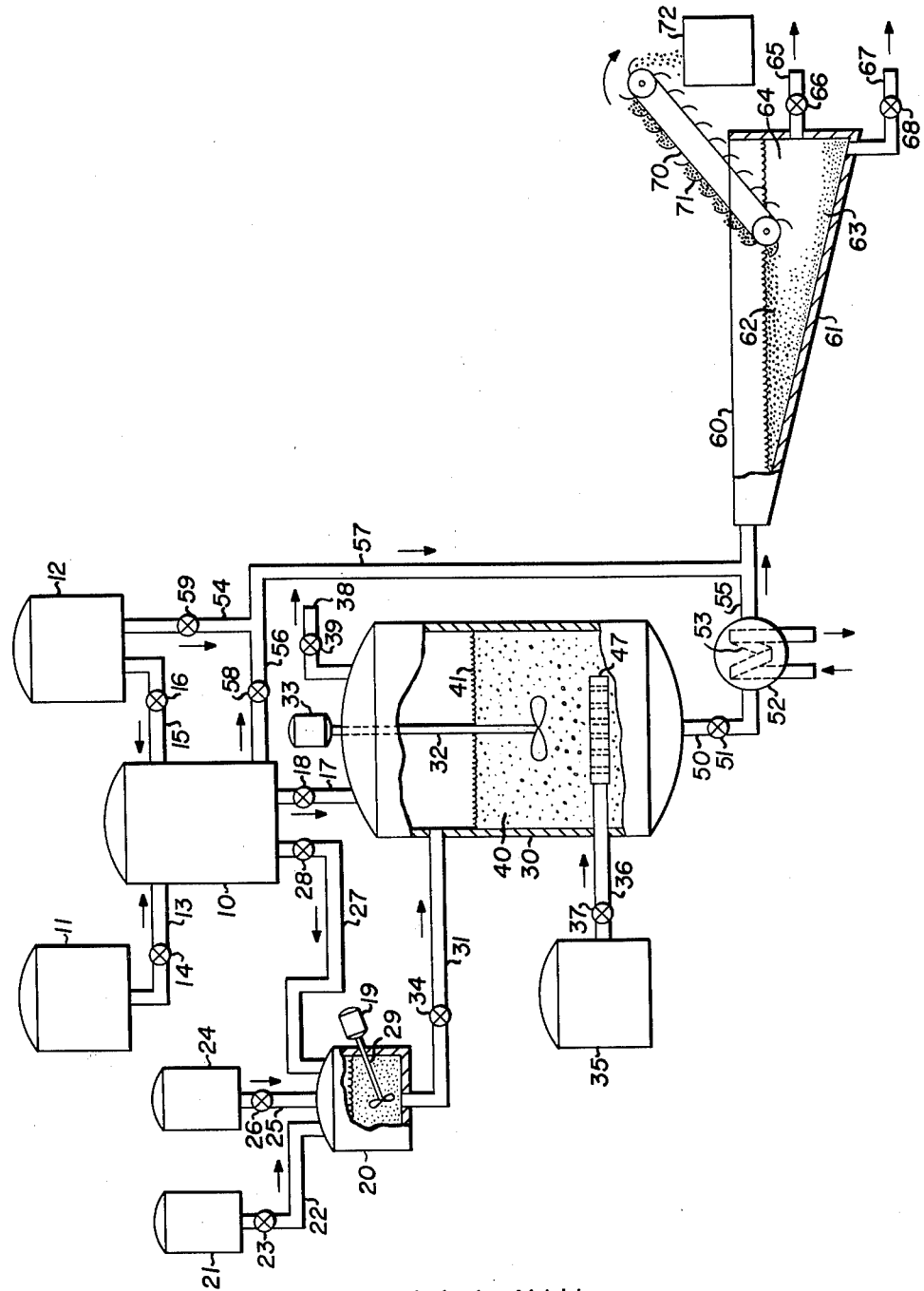
Clyde L. Aldridge
Neville L. Cull
Inventors
By *W. H. Smyers* Attorney

3,056,771
POLYMERIZATION PROCESS
Clyde Lee Aldridge and Neville Leverne Cull, Baker, La., assignors to Esso Research and Engineering Company, a corporation of Delaware
Filed Aug. 1, 1955, Ser. No. 525,436
1 Claim. (Cl. 260—94.9)

This invention relates to polymerization and more particularly relates to the recovery of polymeric products from polymerization reaction mixtures. Still more particularly the present invention relates to an improved method for recovering from a heterogeneous phase polymerization reaction mixture, a polymeric product prepared by polymerizing monomers in the presence of a catalyst obtained by mixing a compound having reducing properties, such as an aluminum trialkyl or a dialkyl aluminum halide, with a reducible metal compound, such as titanium tetrachloride.

The polymerization of monomers to produce useful polymeric products is generally well known. One of the problems encountered in these polymerization processes is the separation and recovery of the polymeric products from the polymerization reaction mixtures. In general, it is desired that the method of recovery be rapid, effective and economical. Furthermore, in many instances, it is essential that a polymeric product of high purity be obtained. This necessitates in most instances an effective separation of the polymeric product from contaminants, particularly from the polymerization catalyst used in the polymerization reaction. The effective separation of the polymeric product from the reaction mixture is particularly difficult when the polymerization catalyst is in the form of a finely divided solid.

A novel method has now been found for effectively separating and recovering polymeric products from heterogeneous phase polymerization reaction mixtures. The term "heterogeneous phase polymerization reaction mixture" as used in this specification refers to a mixture obtained as a result of polymerizing monomers in the presence of a polymerization catalyst and an inert liquid diluent, the resultant polymeric product and at least a substantial portion of the polymerization catalyst (e.g. at least 10 wt. percent) being essentially insoluble in the inert liquid diluent at normal temperatures (e.g. about 70° F.). In brief, the improved method of the present invention comprises settling the polymerization reaction mixture in the presence of an inert liquid diluent having a density intermediate to the density of the catalyst employed in the polymerization process and the density of the polymeric product to thereby obtain a separate and distinct layer of the polymeric product, which layer may then be readily recovered from the remainder of the settled mixture. The inert liquid diluent employed should be one in which the desired polymeric product is essentially insoluble. The present method may be carried out, for example, in one embodiment of the invention by employing the inert liquid diluent which is used in the product recovery steps as the diluent in the polymerization reaction, whenever the latter is desirable. In another embodiment of the invention, additional inert liquid diluent may be added to the reaction mixture subsequent to the polymerization reaction to thereby adjust the density of the total inert liquid diluent to the desired value.

It has been found that the present method is particularly effective when employed in a polymerization process employing a catalyst comprising a mixture of (1) a compound having reducing properties, such as an aluminum trialkyl or a dialkyl aluminum halide, and (2) a reducible metal compound, such as titanium tetrachloride. In such a polymerization process, it is preferred to carry out the polymerization in the presence of an inert liquid diluent such as a saturated organic compound, particularly hydrocarbons, halogenated hydrocarbons or mixture of hydrocarbons and halogenated hydrocarbons in accordance with the present invention. Generally the polymeric product in this process has a density substantially lower than that of the polymerization catalyst employed in the polymerization reaction. In this case then an inert liquid diluent is selected which has a density greater than the density of the polymeric product but less than the density of the polymerization catalyst. It is of course essential to select an inert liquid diluent in which the polymeric product is essentially insoluble at the conditions of separation. In general the polymeric products and a substantial portion of the aforementioned catalyst mixtures are insoluble at room temperatures or normal atmospheric temperatures in hydrocarbons, halogenated hydrocarbons and mixtures thereof. The present method provides a particularly effective separation of the polymeric products from the catalyst which is insoluble in the inert liquid diluent.

As stated above, the present invention is particularly applicable to a polymerization process wherein unsaturated monomers are polymerized or copolymerized in the presence of a catalyst mixture comprising a reducing compound and a reducible metal compound. The preferred unsaturated monomers which are polymerized in this process are olefinic hydrocarbons, preferably monoolefinic hydrocarbons having about 2 to 8 carbon atoms, preferably about 2 to 4 carbon atoms. Specific examples of such olefinic hydrocarbons include ethylene, propylene, butylene, isobutylenes, amylene, isoamylenes, hexene, isohexenes, heptene, isoheptenes, octene and isooctenes. Other monomers may be employed if desired such as styrene, butadiene, vinyl esters and the like. If desired, copolymers of two or more such monomers may be prepared. The present method is particularly applicable to the polymerization of ethylene.

The catalyst employed in the preferred polymerization reaction is formed by mixing a compound, preferably a metal compound, having reducing properties with a reducible metal compound. More particularly, the metal compound having reducing properties is preferably an aluminum hydride or organo-aluminum compound such as aluminum dialkyls or diaryls or aluminum trialkyls or triaryls. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. In general, the aluminum compounds useful in the present invention have the general formula

where R and R' are members selected from the group consisting of hydrogen, alkyl radicals and aryl radicals and X is a member selected from the group consisting of hydrogen, halogen atoms, alkoxy radicals, aryloxy radicals, secondary amino radicals, secondary acid amide radicals, mercapto radicals, thiophenol radicals, radicals of carboxylic acids and radicals of sulfonic acids. The preferred aluminum compounds are (1) dialkyl aluminum monohalides containing about 2 to 4 carbon atoms in the alkyl groups and chlorine or bromine atoms, particularly chlorine atoms, and (2) aluminum trialkyls containing about 2 to 4 carbon atoms in the alkyl groups.

The reducible metal compound is one of a metal of groups IV-B, V-B, VI-B and VIII of the periodic system of elements as given on page 178 of the VIth edition of Smith's College Chemistry by William H. Ehret. Examples of such elements include titanium, zirconium, hafnium, thorium, uranium, vanadium, columbium, tantalum, chromium, molybdenum and tungsten. Examples of the compounds of these metals which may be used include halides such as chlorides or bromides, oxy halides such as oxychlorides, complex halides such as complex fluorides, freshly precipitated oxides or hydroxides, organic compounds such as alcoholates, acetates, benzoates or acetyl acetonates. The preferred salts are those of titanium, zirconium, thorium, uranium and chromium. Titanium salts are particularly preferred such as titanium tetrachloride, titanium oxychloride or titanium acetyl acetonate.

The catalyst mixture is prepared simply by mixing the metal compound having reducing properties with the reducible heavy metal compound. Preferably the two ingredients are intimately mixed in the presence of an inert liquid diluent useful in the present invention. In general, at least one mole of the metal compound having reducing properties will be mixed with a mole of reducible metal compound. Preferably the molar ratio of the reducing metal compound to the reducible metal compound is in the range of about 2:1 to 12:1, more preferably about 3:1 to 8:1. The catalyst mixture is prepared preferably using an inert liquid diluent in an amount sufficient to form a mixture containing about 0.2 to 25.0 weight percent of the catalyst components, and employing mixing temperatures in the range of about −20 to 150° F. and mixing times of about 5 minutes to 24 hours. The optimum conditions for preparing the catalyst depend in large measure on the particular aluminum alkyl used as the reducing agent. For example, aluminum triethyl can be employed using relatively low concentrations and temperatures to form an active catalyst. On the other hand, when using aluminum diethyl chloride at approximately .5 weight percent concentration, heating times of about 15 to 30 minutes at temperatures of about 120 to 140° F. give the most active catalyst. When the two catalyst components are mixed in the presence of an inert liquid diluent, a precipitate is generally formed which is insoluble in the inert liquid diluent. This precipitate in general has a density at 30° C. generally in the range of about 1.4 to 2.0, usually about 1.6 to 1.8 grams/cubic centimeter. The precipitate is in general in a finely divided form.

The preferred polymerization reaction is carried out by contacting the aforedescribed polymerization catalyst with the unsaturated monomers. Preferably this reaction is carried out using an inert liquid diluent of the present invention which has a density intermediate to the density of the polymeric product produced in the reaction and the density of the insoluble polymerization catalyst employed in the reaction. In this particular polymerization process, the polymeric product will have in general a density substantially less than the insoluble polymerization catalyst so that the inert diluent should be selected to have a density less than that of the polymerization catalyst but greater than the density of the polymeric product. In general, the polymeric product will have a density at 30° C. in the range of about .90 to 1.05, usually about .95 to 1.00 grams/cubic centimeter. Thus the inert liquid diluent employed in accordance with this invention in the polymerization reaction should have a density at 30° C. in the range of at least about .9 to 1.8 and preferably at least about .95 to 1.2 grams/cubic centimeter. It is essential in the selection of the inert liquid diluent to choose one in which the polymeric product is essentially insoluble. In general, the polymerization catalyst and the polymeric product are insoluble in most organic solvents at room temperatures. More specifically, the polymeric products (having molecular weights above about 2,000) are essentially insoluble in all solvents at room temperature. The lower molecular weight products having molecular weights below about 100,000 are partially soluble at temperatures above 70° C. while the higher molecular weight polymeric products, that is, those having a molecular weight above 100,000, are only partially soluble at temperatures above 100° C. The molecular weights referred to in this specification are those determined by intrinsic viscosities, using the following equation:

$$\frac{\log\left(\frac{\text{Intrinsic viscosity}}{1.35 \times 10^{-4}}\right)}{.63} = \log M_v$$

Specific examples of inert liquid diluents useful in the present invention and particularly useful in the polymerization of ethylene include the following materials:

| Solvent Components | | Ratio by Volume, A/B |
|---|---|---|
| A | B | |
| n-heptane | perfluoro-methylcyclohexane | 71/29 |
| benzene | chlorobenzene | 60/40 |
| benzene | dichlorobenzene (commercial mixture of isomers) | 71/29 |
| Fluorobenzene | | pure |

The amount of the inert liquid diluent employed in the polymerization process should be such that the final polymeric product in the reaction mixture does not exceed about 40 weight percent so that a relatively fluid reaction mixture is produced. Preferably the amount of inert diluent is such that the polymeric product in the final reaction mixture is in the range of about 1% to 25% by weight. The proportion of catalyst based on the inert liquid diluent will generally be in the range of about 0.05 to 0.5 weight percent, preferably about 0.1 to 0.2 weight percent.

The polymerization reaction conditions, that is, time, temperature and pressure, are adjusted to produce polymers or copolymers having molecular weights of at least about 2,000, preferably at least about 10,000. Polymeric products having molecular weights up to 2,000,000 to 5,000,000 or higher may be prepared. Generally, temperatures in the range of about −40 to 200° C., preferably about 20° to 80° C., and more preferably about 50° to 60° C., may be employed. Higher temperatures may be employed if desired, but temperatures above about 250° C. are undesirable generally since the catalyst decomposes to a considerable extent at this temperature. In general, pressures in the range of about 1 to 250 atmospheres or higher may be employed. If desired, subatmospheric pressures may be employed with certain monomers. The present process is particularly effective for polymerizing ethylene and this polymerization may be carried out conveniently by employing pressures of about 1 to 10 atmospheres. An advantage of the present process is that relatively low pressures may be employed. In order to obtain polymeric products having molecular weights above about 2,000, a polymerization reaction time of at least about 15 minutes will be required. Generally, polymerization reaction times in the range of about 15 minutes to 24 hours, usually about 2 to 6 hours, will be employed.

Polyethylenes produced in the method of this invention are almost completely linear in their molecular structure and have practically no branched chains, at most about three branched methyl groups for every hundred carbon atoms in the linear chain. The polymeric products, particularly the polyethylenes, are useful for electrical insulation, preparing molded items, plastic pipe, tile, films, coatings, fibers and the like.

After the polymerization reaction has been completed, it is necessary to recover the polymeric product from the polymerization mixture. This may be carried out on either a batch or a continuous basis, as may the polymerization reaction itself. If elevated polymerization temperatures were employed, it may be desirable, prior to recovery of the polymeric product, to cool the reaction mixture to approximately room temperature, or at least below about 70° C., to assure essentially complete insolubility of the polymeric product in the inert liquid diluent.

In accordance with the present invention, the polymerization mixture is allowed to settle sufficiently so that the polymeric product separates as an upper layer suspended on the inert liquid diluent. This settling step may be carried out in the polymerization reactor employed in the polymerization reaction if desired. However, generally it is preferred to withdraw the polymerization reaction mixture from the polymerization reactor and to pass the mixture to a separate settling zone. If desired, additional diluent may be added to the polymerization reaction mixture prior to or during the passage of the reaction mixture to the settling zone. This additional diluent added at this point may be a different diluent from that employed in the polymerization reaction. For example, the density of the additional diluent may be selected so that its addition to the polymerization reaction mixture will adjust the density of the diluent so as to provide a resultant diluent density which falls between the densities of the polymeric product and the polymerization catalyst.

The settling operation may be carried out on either a batch or continuous basis. When employing a batch process, the polymerization reaction mixture is simply added to a tank and permitted to settle for a short period of time to produce an upper layer of the polymeric product. The settling time will depend upon the relative densities of the polymerization catalyst and the polymeric product and the inert liquid diluent. In general, it is desirable that the density of the inert liquid diluent be at least about 5% greater than the density of the polymeric product and be at least about 5% less than the density of the polymerization catalyst. In such cases, effective settling of the reaction mixture to form a layer of polymeric product suspended on top of the inert liquid diluent can be obtained after about 5 to 30 minutes of settling. It will be understood that longer settling times may be employed but generally will not be required.

Upon completion of the settling step, that is, after the polymeric product has separated as an upper layer, the polymeric product may be recovered by skimming the polymeric product off the upper surface of the inert liquid diluent. The degree of settling of the insoluble catalyst will be dependent upon its particle size. Relatively large catalyst particles will tend to settle out as a bottom layer in the settling zone. In this case the inert liquid diluent may be decanted to separate it from the catalyst settled out at the bottom of the settling zone. This separated inert liquid diluent may then be recycled, if desired, to the polymerization reactor for use in subsequent polymerization reactions. The polymerization catalyst may then be withdrawn from the settling zone, generally in the form of a thick slurry which may also be recycled to the polymerization reactor for use in subsequent polymerization reactions. However, when the insoluble catalyst is very finely divided (i.e., in a colloidal form) very little catalyst will settle out as a bottom layer so that in this case the inert liquid diluent containing the suspended insoluble catalyst may be recycled to the polymerization zone after the polymeric product has been skimmed off.

The recovered polymeric product may be washed with, for example, alcohol, e.g., methyl alcohol, isopropyl alcohol, n-butanol, etc., to remove essentially all of the contaminants, such as traces of catalyst, therefrom. The polymeric product may then be dried to provide a material suitable for use in the preparation of electrical insulation, films and the like.

The settling operation may be carried out effectively on a continuous basis by passing the polymerization reaction mixture into one end of an inclined settling tank or trough wherein the reaction mixture flows generally in a downwardly inclined direction. In this way, the polymerization reaction mixture is introduced into one side of the inclined settling tank; the polymeric product is skimmed off the upper surface of the inert liquid diluent, and the polymerization catalyst and inert liquid diluent are withdrawn from the other side of the settling tank.

The present invention will be better understood by reference to the attached drawing which is a diagrammatic illustration of equipment useful in carrying out a preferred embodiment of the present invention. Referring now to the drawing, reference character 10 designates a tank which contains an inert liquid diluent which will be used hereinafter as the inert liquid diluent in a polymerization reaction. This inert liquid diluent is one which has a density intermediate to the density of the polymerization catalyst to be used in the subsequent polymerization process and the density of the polymeric product produced in the polymerization process. Also, this inert liquid diluent is one in which the polymeric product is essentially insoluble. The inert liquid diluent may be a single chemical compound such as a hydrocarbon or halogenated hydrocarbon or it may be a mixture, for example, of a halogenated hydrocarbon and a hydrocarbon. In the drawing, reference character 11 designates a storage tank for a hydrocarbon diluent such as, for example, n-heptane. Reference character 12 designates a second storage tank wherein a halogenated hydrocarbon such as, for example, perfluoro-methylcyclohexane is stored. A mixture of the hydrocarbon diluent and the halogenated hydrocarbon diluent may be prepared in tank 10 by passing thereto the hydrocarbon diluent through line 13 by opening valve 14 therein and passing the halogenated hydrocarbon diluent through line 15 by opening valve 16 therein. In this way, an inert liquid diluent can be prepared in tank 10 of the desired density by blending two different diluents of different individual densities. For example, a mixture of about 25 to 35 volume percent of perfluoromethylcyclohexane and about 75 to 65% by volume of n-heptane is blended in tank 10 and can be used in the subsequent polymerization process. The blended inert liquid diluent is passed from tank 10 into reactor 30 through line 17 by opening valve 18 therein.

The catalyst to be employed in the polymerization reaction is prepared in tank 20. A compound having reducing properties such as, for example, triethyl aluminum, is stored in tank 21 and is passed through line 22 by opening valve 23 into tank 20. A reducible metal compound, such as, for example, titanium tetrachloride, is stored in tank 24 and is passed into tank 20 through line 25 by opening valve 26. In general, it is preferred to mix the reducing compound with the reducible metal compound in the presence of an inert liquid diluent. Thus, in the drawing, inert liquid diluent may be passed into tank 20 from tank 10 through line 27 by opening valve 28 therein. Subsequently the reducing compound is introduced into tank 20 from tank 21 and the reducible metal compound is introduced into tank 20 from tank 24. The mixing of the reducing compound and the reducible metal compound forms a precipitate in the inert liquid diluent which is maintained in suspension by means of stirrer 29 operated by motor 19. The catalyst suspended in tank 20 is introduced into reactor 30 through line 31 by opening valve 34 therein.

Reactor 30 is provided with stirrer 32 operated by motor 33 which provides intimate mixing of the reactants and diluent in reactor 30 and maintains the catalyst in the form of a suspension in the inert liquid diluent. An olefinic hydrocarbon such as ethylene is stored in tank 35 and is passed through line 36 by opening valve 37 therein and through distributing plate 47 which is provided with a plurality of perforations into reaction mixture 40 having upper level 41 in reactor 30. If desired, reactor 30 may be provided with means (not shown) for heating or cooling reaction mixture 40 in reactor 30. For example, heating or cooling coils may be arranged within reaction mixture 40, or reactor 30 may be provided with a steam jacket or cooling water jacket if desired. Reactor 30 is provided with vent line 38 containing valve 39. If the polymerization reaction is carried out at atmospheric pressure, valve 39 should be open, thus venting reactor 30 to the atmosphere. If it is desired to carry out the polymerization reaction at subatmospheric or superatmospheric pressure, valve 39 in line 38 is maintained in a closed position.

The polymerization reaction may be carried out on either a batch or continuous basis. If a batch process is employed, the inert liquid diluent and catalyst suspension may be added to reactor 30 and then the monomers may be introduced. Then after the polymerization has reached the desired point, the reaction mixture may be withdrawn from reactor 30 through line 50 by opening valve 51 therein. However, generally it is preferred to operate on a continuous basis. In this case, inert liquid diluent is continuously passed into reactor 30 from tank 10; catalyst suspension is continuously passed into reactor 30 from tank 20 and the olefinic hydrocarbon is continuously passed into reactor 30 from tank 35. Also, the polymerization reaction mixture is continuously withdrawn from reactor 30 through line 50. The flow rate of each stream is adjusted to provide the desired reaction conditions in reactor 30 (i.e., residence time, proportions of catalyst, monomers, etc.).

The polymerization reaction mixture may then be passed through heat exchanger 52 wherein the reaction mixture may be' cooled by, for example, cool water passing through coil 43. The reaction mixture passing from exchanger 52 flows through line 55 into settling tank 60. If desired, additional inert diluent may be added to the reaction mixture flowing through line 55 by passing inert diluent from tank 10 to lines 56 and 57 by opening valve 58 in line 56. Also, if desired, the inert diluent employed in reactor 30 may be a hydrocarbon diluent and in this case a halogenated hydrocarbon diluent may be passed from tank 12 through lines 50, 54 and 57 (by opening valve 59 in line 54) into the polymerization reaction mixture flowing through line 55 to adjust the density of the inert diluent to a value intermediate to the density of the polymeric product formed in reactor 30 and the density of the polymerization catalyst employed in reactor 30.

The reaction mixture flowing through line 55 is introduced into settling tank 60 which has an inclined bottom surface 61 sloping downwardly from the point of introduction of the reaction mixture. In the drawing, the polymerization reaction mixture flows from left to right and in so doing separates to form an upper layer 62 which represents the polymeric product, for example, polyethylene. The insoluble catalyst may or may not settle out as a distinct and separate bottom layer; as stated heretofore this will depend upon the particle size of the catalyst. In the embodiment shown in the drawing, the polymerization reaction mixture is shown as separating into three relatively well-defined layers; namely, upper layer 62 represents the polymeric product; bottom layer 63 represents the polymerization catalyst and intermediate layer 64 represents the inert liquid diluent. In this embodiment of the invention, the separated polymeric product representing upper layer 62 is continuously skimmed off the inert diluent layer 64 by means of conveyor 70 which is provided with a plurality of scoops 71 which continuously remove the polymeric product from the right-hand side of settling tank 60 and deposit the polymeric product in storage bin 72. The separated inert liquid diluent representing intermediate layer 64 is continuously withdrawn from the right-hand side of settling tank 60 through line 65 by opening valve 66 therein. In a like manner, the polymerization catalyst settling out as bottom layer 63 is withdrawn continuously as a slurry from the right-hand bottom portion of settling tank 60 through line 67 by opening valve 68 therein. The separated inert liquid diluent and the separated polymerization catalyst may be recycled to the polymerization process if desired. Also, if desired, the separated inert liquid diluent and separated polymerization catalyst may be withdrawn continuously as a combined stream from settling tank 60 through line 67, in which case, if desired, the combined stream may be recycled to the polymerization process. In the case where the insoluble catalyst is very finely divided such that essentially no catalyst settles out at the bottom of settling tank 60, the inert liquid diluent containing the suspended catalyst may be withdrawn from tank 60 through line 67, and if desired recycled to reactor 30. The polymeric product collected in storage bin 72 may be passed to subsequent processing such as washing and drying, if desired.

The invention will be more fully understood by reference to the following example. It is pointed out, however, that the example is given for the purpose of illustration only and is not to be construed as limiting the scope of the present invention in any way.

*Example*

In this example, a polyethylene having a molecular weight of about 55,000 was prepared employing as a catalyst a mixture of aluminum triethyl and titanium tetrachloride and employing as an inert diluent, a mixture of about 28 volume percent of perfluoro-methylcyclohexane and about 72 volume percent of n-heptane.

The catalyst was prepared as follows: 6.36 grams of a 20 weight percent aluminum triethyl in n-heptane were added to 15 cc. of n-heptane in a small stoppered flask which had been well flushed with nitrogen. To the flask was added 1.662 g. of $TiCl_4$ to give an Al/Ti ratio of 1/1.28. Then the contents of the flask were diluted with 420 cc. of a solvent which consisted of 120 cc. of perfluoro-methylcyclohexane and 300 cc. of n-heptane.

The polymerization of ethylene was carried out as follows: The catalyst mixture containing 1.27 g. of aluminum triethyl and 1.66 g. of $TiCl_4$ in a solution of perfluoro-methylcyclohexane and heptane prepared as described above was transferred to a 2-liter glass reactor. The reactor was equipped with an ethylene inlet line, a stirrer and a vent for releasing unconverted ethylene gas through a wet test meter. Ethylene gas was passed into the reactor with stirring for approximately 1½ hours. 80 grams of polymer were produced of 55,000 molecular weight.

Polyethylene product was recovered from the polymerization reaction mixture in the following manner: A 100 ml. sample of the polymer slurry was removed. The polymer did not float, but upon adding 50 ml. of a 30% solution of the perfluoro-methylcyclohexane in heptane the polymer floated readily. No unconverted catalyst settled out in this instance.

What is claimed is:

In the method for preparing polyethylene having a molecular weight in the range of 2,000 to 2,000,000 by polymerizing ethylene in an inert liquid diluent in contact with a polymerization catalyst formed by mixing from 3 to 4 moles of aluminum triethyl with one mole of titanium tetrachloride and then recovering polyethylene from the resultant polymerization reaction mixture, the improvement which comprises obtaining a separate layer of polyethylene in said reaction mixture by controlling the density of the inert liquid diluent responsive to the densities of the catalyst and the polyethylene by forming the inert diluent from 25 to 35 volume percent 1-perfluoro-methylcyclohexane and 75 to 65 volume percent n-heptane.

References Cited in the file of this patent

UNITED STATES PATENTS 2,730,235     Swimmer _____ Jan. 10, 1956

FOREIGN PATENTS 533,362     Belgium _____ Nov. 16, 1954